US012691573B2

(12) United States Patent　　　(10) Patent No.:　US 12,691,573 B2
Huang　　　　　　　　　　　　　　(45) Date of Patent:　　　Jul. 28, 2026

(54) INDUSTRIAL ROBOT

(71) Applicant: Weiyuan Huang, Suzhou (CN)

(72) Inventor: Weiyuan Huang, Suzhou (CN)

( * ) Notice: Subject to any disclaimer, the term of this patent is extended or adjusted under 35 U.S.C. 154(b) by 0 days.

(21) Appl. No.: 18/942,818

(22) Filed: Nov. 11, 2024

(65) Prior Publication Data

US 2025/0153344 A1　　May 15, 2025

(30) Foreign Application Priority Data

Nov. 10, 2023　(CN) .......................... 202311497254.4

(51) Int. Cl.
B25J 9/06　　　　(2006.01)

(52) U.S. Cl.
CPC ...................................... B25J 9/06 (2013.01)

(58) Field of Classification Search
CPC ...... B25J 9/06; B25J 19/0008; B25J 19/0012; B25J 19/0091; B25J 19/06
See application file for complete search history.

(56) References Cited

U.S. PATENT DOCUMENTS

| | | | | |
|---|---|---|---|---|
| 5,115,690 A | * | 5/1992 | Torii | .................... B25J 19/0029 |
| | | | | 901/27 |
| 5,305,652 A | * | 4/1994 | Zimmer | ................... B25J 9/047 |
| | | | | 901/19 |
| 5,901,613 A | * | 5/1999 | Forslund | ................. B25J 9/046 |
| | | | | 901/23 |

| | | | | |
|---|---|---|---|---|
| 6,267,022 B1 | * | 7/2001 | Suzuki | ................. B25J 19/0079 |
| | | | | 901/49 |
| 6,675,069 B2 | * | 1/2004 | Uratani | .................... B25J 9/046 |
| | | | | 414/696 |
| 8,219,245 B2 | * | 7/2012 | Merk | ........................ B25J 9/102 |
| | | | | 700/250 |
| 9,950,423 B2 | * | 4/2018 | Krumbacher | ............ B25J 9/105 |
| 2016/0031094 A1 | * | 2/2016 | Tsutsumi | ............. B25J 19/0008 |
| | | | | 901/21 |
| 2017/0291297 A1 | * | 10/2017 | Miyasaka | ................ B25J 9/046 |

FOREIGN PATENT DOCUMENTS

| | | | | |
|---|---|---|---|---|
| CN | 2744482 Y | * | 12/2005 | |
| CN | 204278009 U | * | 4/2015 | |
| CN | 105729463 A | * | 7/2016 | ................ B25J 9/10 |
| CN | 205766152 U | * | 12/2016 | |
| CN | 108705561 A | * | 10/2018 | ............. B25J 18/00 |
| CN | 112077833 A | * | 12/2020 | ............. B25J 9/106 |
| CN | 115091449 A | * | 9/2022 | ............ B25J 9/1633 |

* cited by examiner

*Primary Examiner* — Bobby Rushing, Jr.
(74) *Attorney, Agent, or Firm* — Jose Cherson Weissbrot

(57) ABSTRACT

The present application discloses an industrial robot, includes: a rotating seat, which is rotatable, a transmission seat is provided on the rotating seat, and a first transmission is installed in the transmission seat; a first arm, and a second arm connected with the first arm, the first arm is rotatable and includes a first end and a second end arranged from the bottom up, at least a part between the first end and the second end is an inclined plane, and the inclined plane extends from the second end to the first end in an inclined manner, thereby the second arm is substantially located directly above the central line of the transmission seat.

10 Claims, 7 Drawing Sheets

INDUSTRIAL ROBOT

CROSS-REFERENCE TO RELATED APPLICATIONS

The present application is based upon and claims priority to Chinese patent application No. 202311497254.4, filed on Nov. 10, 2023, the entire content of which is incorporated herein by reference.

TECHNICAL FIELD

The present disclosure relates to the field of robots, and in particular to a multi-axis robot.

BACKGROUND

At present, industrial robots are gradually replacing human labor in repetitive and hard physical labor handling work in more and more fields. The use of a multi-axis robot in a processing center, especially the use of a multi-axis robot while clamping heavy objects, can achieve processing at different heights, angles and positions more easily. In such application scenario, higher requirements are placed on the stability, the flexibility and the accuracy of the robot.

SUMMARY

In order to overcome the disadvantages in the prior art, the embodiments of the present disclosure provide an industrial robot. The industrial robot has an overall structure and a transmission structure which are balanced and stable, and has a high degree of freedom.

In order to achieve the above purpose, the technical scheme used by the present disclosure is an industrial robot, including:

a rotating seat, which is rotatable and includes a transmission seat provided thereon, and a first transmission is installed in the transmission seat;

a first arm, and a second arm connected with the first arm, the first arm is rotatable and includes a first end and a second end arranged from the bottom up, at least a part between the first end and the second end has an inclined plane which extends from the second end to the first end in an inclined way so that the second arm is substantially located directly above the central line of the transmission seat.

The inclined plane is provided, so that the first end of the first arm is thicker and heavier than the second end. Therefore, the center of gravity of the first arm is closer to the rotating seat, the first end is connected with the rotating seat more stably, and the second end facilitates the installation of other movable arms that require larger movable space.

Generally speaking, the second arm of the multi-axis robot has a greater angle and range of motion than the first arm. Because the inclined plane is provided, although the first end of the first arm is thicker, the motion of the second arm is not influenced, and there is still large movable space between the second arm and the inclined plane. In addition, the second arm is provided at one side of the inclined plane, so that the center of gravity of the first arm is closer to the first transmission in the vertical direction as a whole. In this way, the robot has better stability as a whole. The stress on the gears inside the first transmission will not be biased to one side, and the service life is longer.

As a further improvement, the inclined plane is provided with a protruding reinforcing rib. When the second arm needs to be used to clamp heavier objects, the reinforcing rib can be used to reinforce the strength of the part of the first arm near the second end, and the reinforcing rib is provided on the inclined plane, which also allows the center of gravity of the first arm to be closer to the transmission.

As a further improvement, the industrial robot further includes a pull rod having one end fixed to the second arm, and the other end fixed and connected with an end of the reinforcing rib.

In the case that only one motor is needed to drive the second arm, the pull rod can be connected between the second arm and the inclined plane, and the pull rod gives a pulling force to the second arm. Because the inclined plane is provided, it is more convenient to install the pull rod between the first arm and the second arm.

As a further improvement, the first end is provided with a first connecting part and a second connecting part, which are disposed on both sides of the transmission seat and are connected with the first transmission, and the first connecting part and the second connecting part operate in response to the rotation of the first transmission.

As a further improvement, the industrial robot further includes a first driving shaft, which passes through and is connected with the first transmission, at least one end of the first driving shaft is connected with a motor, and the motor is provided at one side of the first connecting part or the second connecting part opposite the first transmission.

The first arm in the present disclosure is connected with both sides of the transmission seat through the first connecting part and the second connecting part, respectively, so that the first arm is connected with the rotating seat more stably in a more balanced manner. The first driving shaft passes through the first transmission, and a motor can be connected at one end or both ends of the first driving shaft at the same time as required. When two motors need to be used, the motors are provided at one side of the first connecting part and one side of the second connecting part, respectively, so that the weight is distributed in a more balanced manner. Compared with the traditional way of providing a plurality of motors at the same side, the motors according to the present disclosure can be driven coaxially, the gap between transmission gears is smaller, the transmission efficiency, the stability are better and the service life is longer. While the present disclosure ensures the flexibility and the degree of freedom of the robot, the overall structure is more stable, the center of gravity is balanced and stable in the use process, the power is stronger, the transmission efficiency is higher, and the precision coefficient is higher, so that the robot allows more precise processing operations.

As a further improvement, the industrial robot further includes a second transmission, the second arm is connected with the second end through the second transmission, a second driving shaft penetrates through the second transmission and has one end connected with a motor provided at one side of the second end.

As a further improvement, the other end of the second driving shaft is connected with a motor provided at one side of the second arm.

In order to enhance the power of the second arm, motors can be provided at both sides of the second arm at the same time. Similar to the first arm, the two motors are driven by the second driving shaft, which has high concentricity and reduces errors of assembly clearance. At this time, because the two motors have a stronger torque, those skilled in the art can decide whether to install a pull rod between the first arm and the second arm according to the actual needs.

As a further improvement, the second arm is overlapped with the first end of the first arm in the orthographic projection direction, so as to apply the weight of the first arm and the second arm to both sides of the transmission evenly.

As a further improvement, at least one balance lever is provided between the first arm and the rotating seat, one end of which is connected with at least one of the first connecting part and the second connecting part, and the other end of which is connected with the rotating seat.

The first arm according to the present disclosure provides two positions located at both sides of the first transmission, respectively, that is, a first installing part and a second installing part, which are configured to install the balance lever and allow the pulling force provided by the balance lever to be more balanced.

As a further improvement, the transmission seat and the rotating seat are integrally provided on a symmetrical axis of the rotating seat at a position near the edge of the rotating seat, and the first transmission is provided in a through hole of the transmission seat.

The integrated arrangement allows the transmission seat to be connected with the rotating seat more stably. The transmission seat is provided on the symmetrical axis, so that the stress on the rotating seat is more balanced. The transmission seat is provided at the edge position of the rotating seat, so that the movable space of the first arm is larger.

As a further improvement, one side of the rotating seat opposite the transmission seat is provided with a protrusion part which is configured to connect the balance lever of the first arm.

As a further improvement, the industrial robot further includes a base, a slewing bearing is provided between the base and the rotating seat, and a slewing transmission is provided on the inner side of the inner ring of the slewing bearing.

In order to make the above and other purposes, features and advantages of the present disclosure more obvious and understandable, preferred embodiments are specifically illustrated and described in detail with reference to the drawings hereinafter.

BRIEF DESCRIPTION OF THE DRAWINGS

In order to explain the embodiments of the present disclosure or the technical scheme in the prior art more clearly, the drawings needed to be used in the description of the embodiments or the prior art will be briefly introduced hereinafter. Obviously, the drawings in the following description are only some embodiments of the present disclosure. Other drawings can be obtained according to these drawings without paying creative labor for those skilled in the art.

Figure 1:
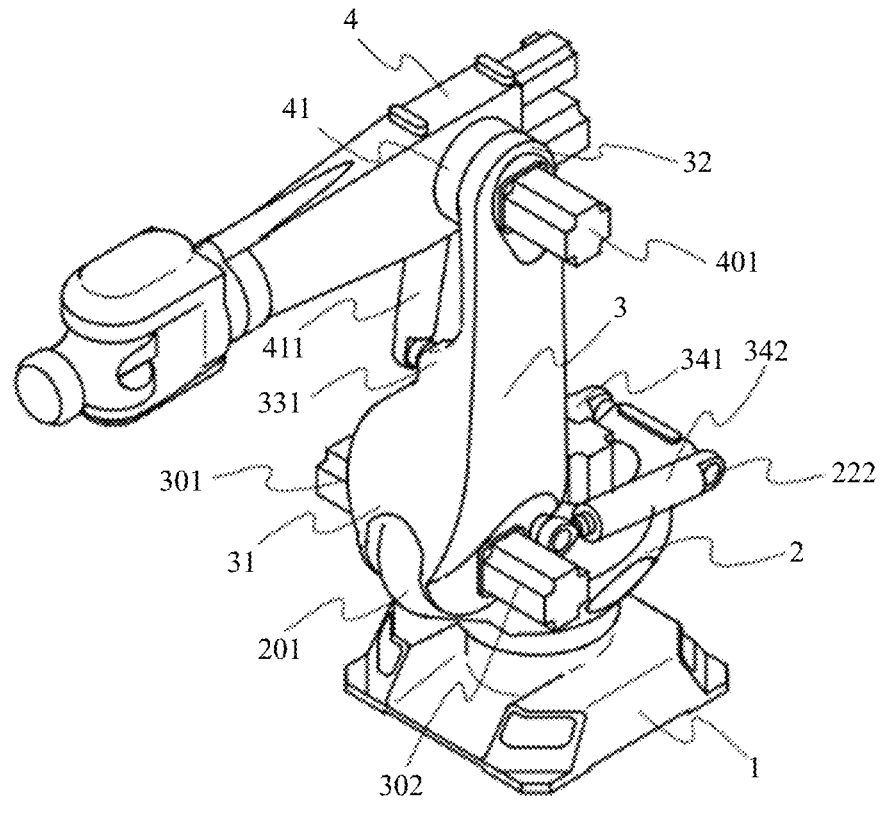
FIG. 1 is a perspective view of an embodiment of the present disclosure.

Reference numerals of the above figures: 1. base; 101. slewing bearing; 2. rotating seat; 3. first arm; 4. second arm; 201. transmission seat; 202. slewing transmission; 221. locating pin; 222. locating pin; 310. through hole; 311. first connecting part; 312. second connecting part; 301. motor; 302. motor; 303. first transmission; 304. first driving shaft; 31. first end; 32. second end; 33. inclined plane; 331. reinforcing rib; 341. balance lever; 342. balance lever; 401. motor; 402. motor; 41. second transmission; 411. pull rod.

DETAILED DESCRIPTION OF THE EMBODIMENTS

The technical scheme in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiments in the present disclosure, all other embodiments obtained by those skilled in the art without paying creative labor belong to the scope of protection of the present disclosure.

EMBODIMENT

Figure 2:
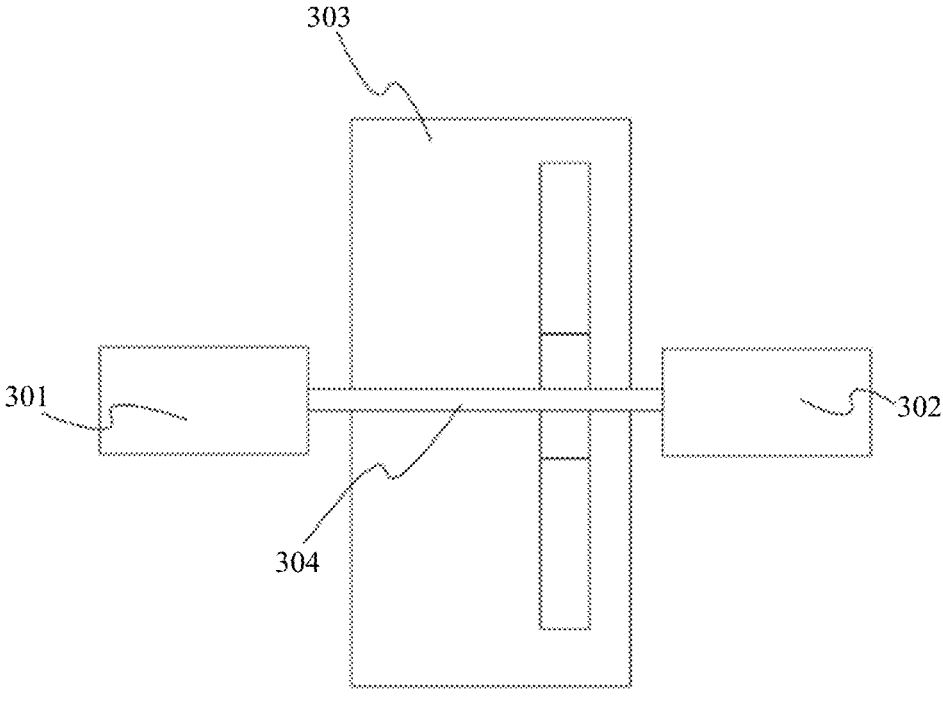
FIG. 2 is a schematic diagram of a driving structure of a first transmission according to the present disclosure.
Figure 8:
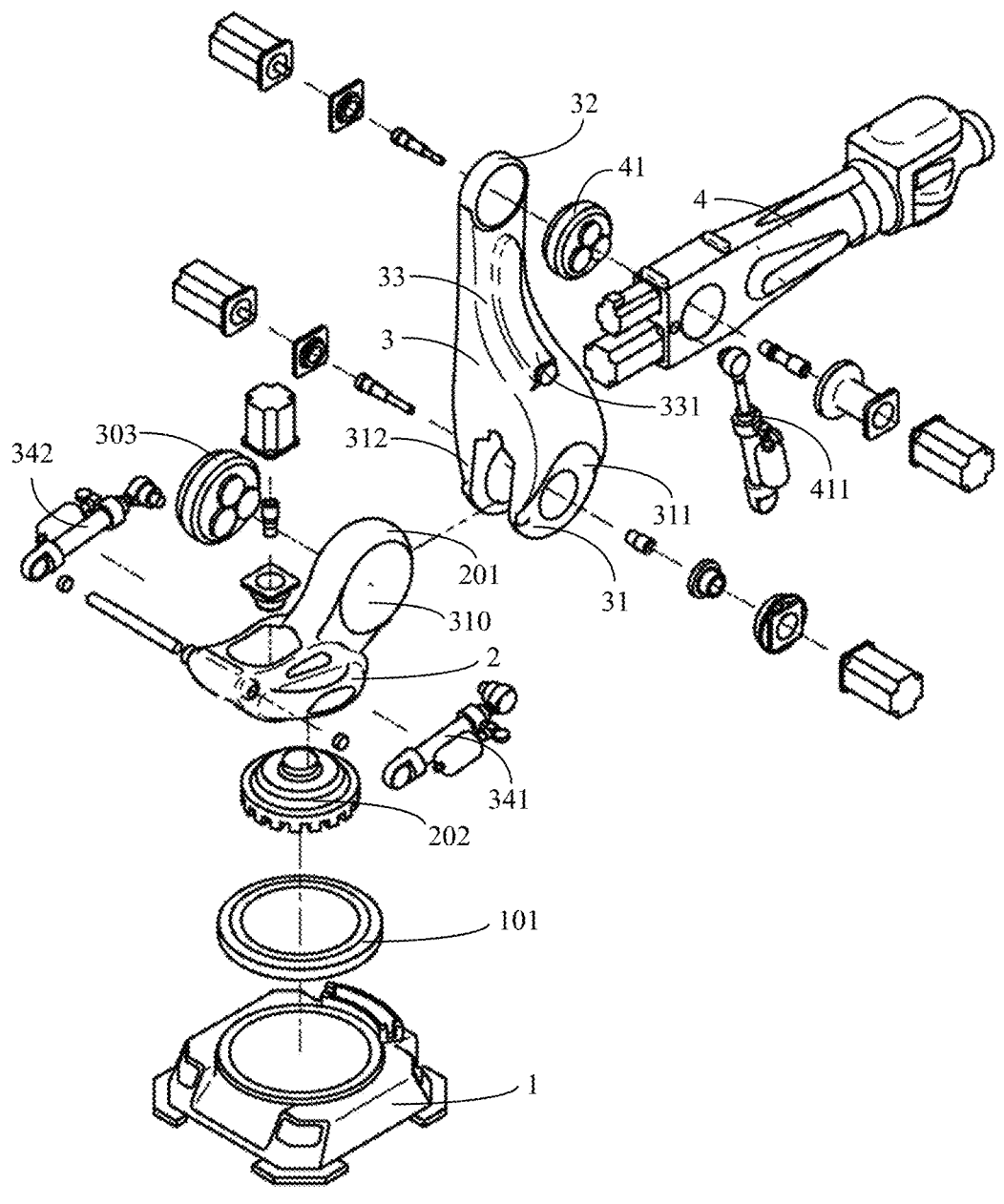
FIG. 8 is an exploded view of the industrial robot of the present disclosure.

As shown in FIG. 1, FIG. 2 and FIG. 8, the present application provides an industrial robot, the industrial robot includes a base 1. The base 1 is fixed on the ground or other movable devices. The base 1 is provided with a rotating seat 2. The rotating seat 2 is rotatable. The rotating seat 2 has a planar symmetrical structure. The rotating seat 2 is provided with a transmission seat 201 formed on the rotating seat 2. The transmission seat 201 is ring-shaped and has a longitudinal plane of symmetry coinciding with a plane of symmetry of the rotating seat 2, and the transmission seat 201 is provided close to the edge of the rotating seat 2.

As shown in FIG. 8, the base 1 and the rotating seat 2 are connected by means of a slewing transmission 202, the rotating seat 2 rotating operate in response to the rotation of the slewing transmission 202.

In a possible embodiment, the base 1 and the rotating seat 2 are also connected to each other by a slewing bearing 101, the slewing transmission 202 is provided on the inner side of the inner ring of the slewing bearing 101. At this point, the rotating seat 2 is connected to the base 1 via both the slewing transmission 202 and the slewing bearing 101. This connection way strengthens the connection strength, and at the same time, under the action of the slewing bearing 101, the slewing transmission 202 can drive a larger load and maintain the action precision without the need to replace a more expensive transmission with a larger load. Among other things, the slewing bearing 101 is an existing, mechanical component known to those skilled in the art.

The transmission seat 201 is provided with a through hole 310, and the first transmission 303 is provided in the through hole 310. A first driving shaft 304 penetrates through the first transmission 303. The first driving shaft 304 passes through the first transmission 303 in the direction of the rotation axis of the first arm 3 and is connected with the first transmission 303 to drive the first transmission 303 to rotate. Both ends of the first driving shaft 304 are connected with motors 301 and 302, respectively. The motors 301 and 302 are connected with the first driving shaft 304. The motors 301 and 302 drive the first driving shaft 304 to rotate.

In one possible embodiment, when the driving force required by the first arm 3 is small, the first driving shaft 304 may be connected with the motor only at one end.

The transmission seat 201 and the rotating seat 2 are integrally provided so as to be more stable as a whole. The transmission seat 201 is provided on the symmetrical axis, so that the stress on the rotating seat 2 is more balanced. The transmission seat 201 is provided at the edge position of the rotating seat 2, so that the movable space of the first arm 3 is larger.

Figure 3:
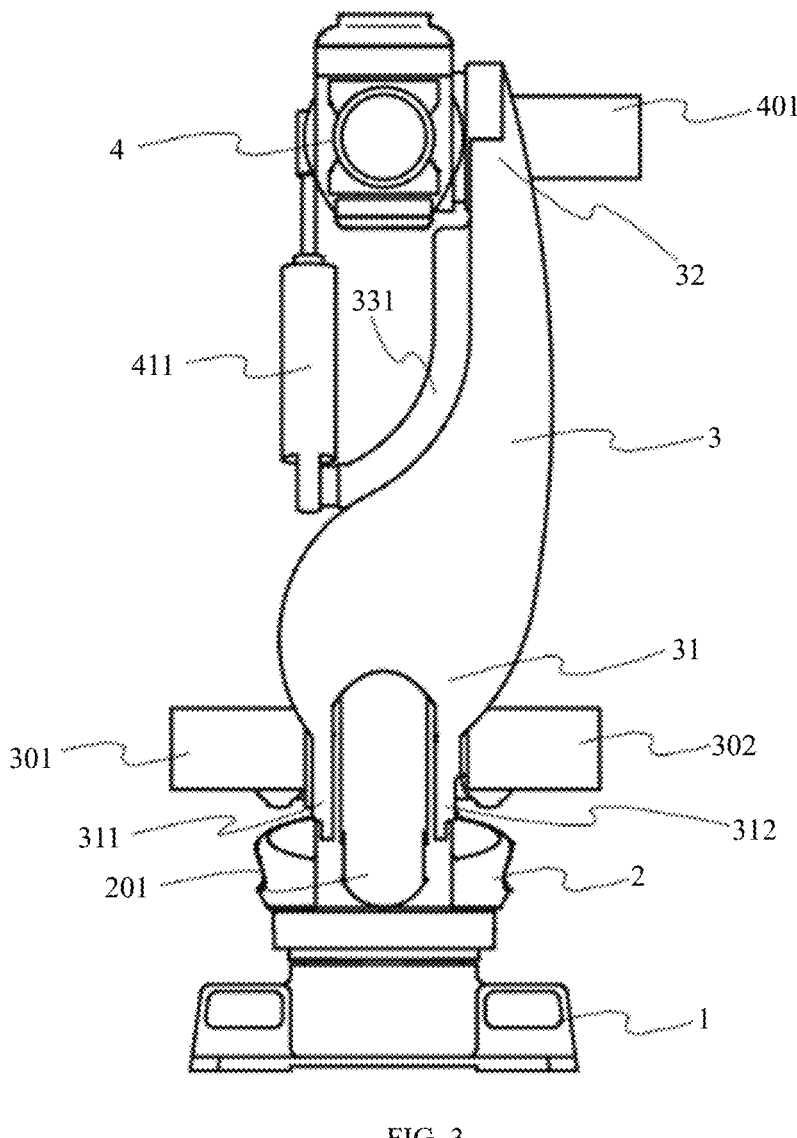
FIG. 3 is a front view of an embodiment of the present disclosure.

As shown in FIG. 3, the first arm 3 is rotatably connected with the first transmission 303 installed in the transmission seat 201. The first arm 3 includes a first end 31 and a second end 32. The first end 31 is provided with a first connecting part 311 and a second connecting part 312. The first connecting part 311 and the second connecting part 312 are provided at both sides of the transmission seat 201 and are connected with both ends of the first transmission 303, respectively. The first transmission 303 drives the first connecting part 311 and the second connecting part 312 to drive the whole first arm 3 to rotate. The motors 301 and 302 are provided on one side of the first connecting part 311 and the second connecting part 312 opposite the first transmission 303, respectively.

The first connecting part 311 and the second connecting part 312 are connected with the balance levers 341 and 342, respectively. The locating pins 221 and 222 are provided at one side of the rotating seat 2 with respect to the transmission seat 201; one end of each of the balance levers 341 and 342 is connected with the first connecting part 311 and the second connecting part 312, respectively, and the other end of each of the balance levers 341 and 342 is connected with the locating pins 221 and 222. The balance levers 341 and 342 provide a pulling force to the first arm 3. The balance levers 341 and 342 provided at both sides allow the pulling force applied to the first arm 3 to be more balanced.

In some possible embodiments, there may be one balance lever or no balance lever.

Figure 4:
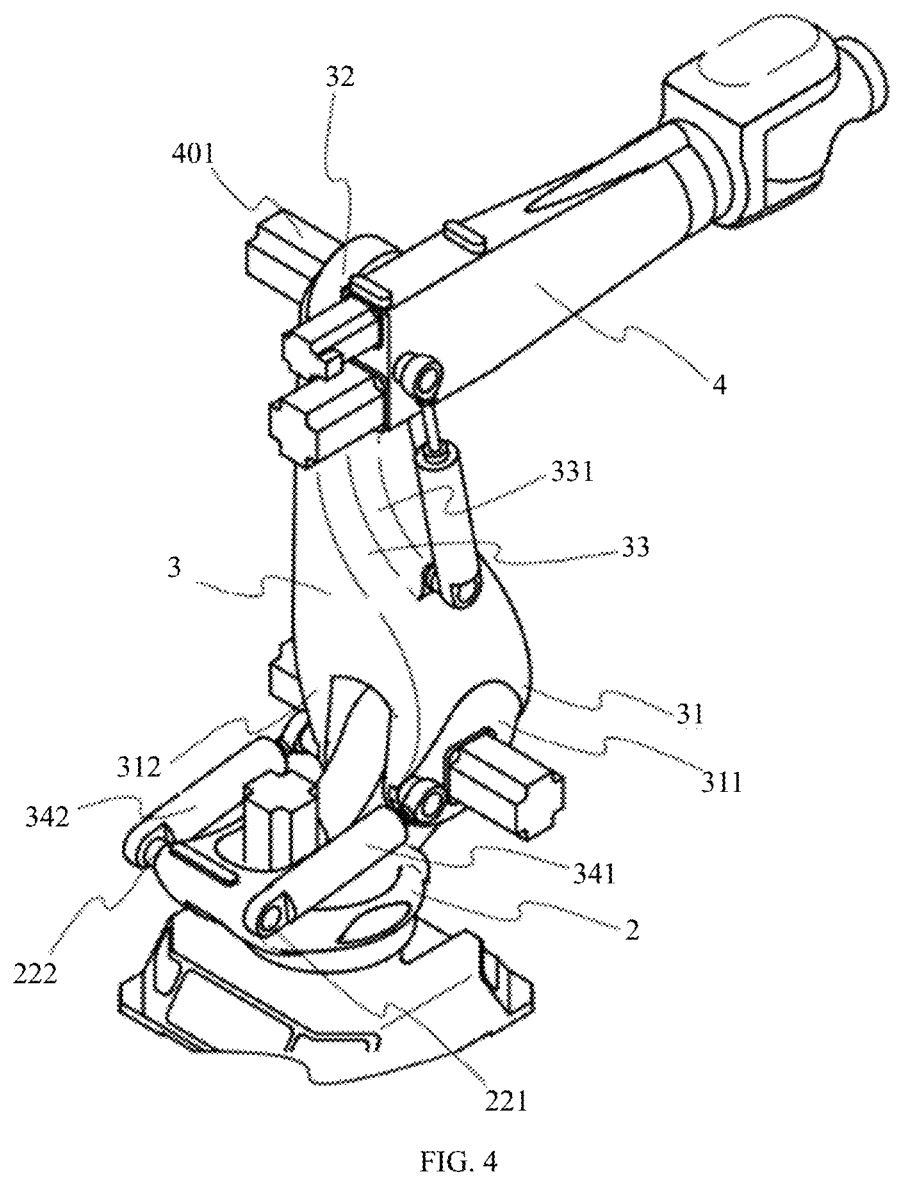
FIG. 4 is perspective view of an embodiment of the present disclosure from another angle.
Figure 5:
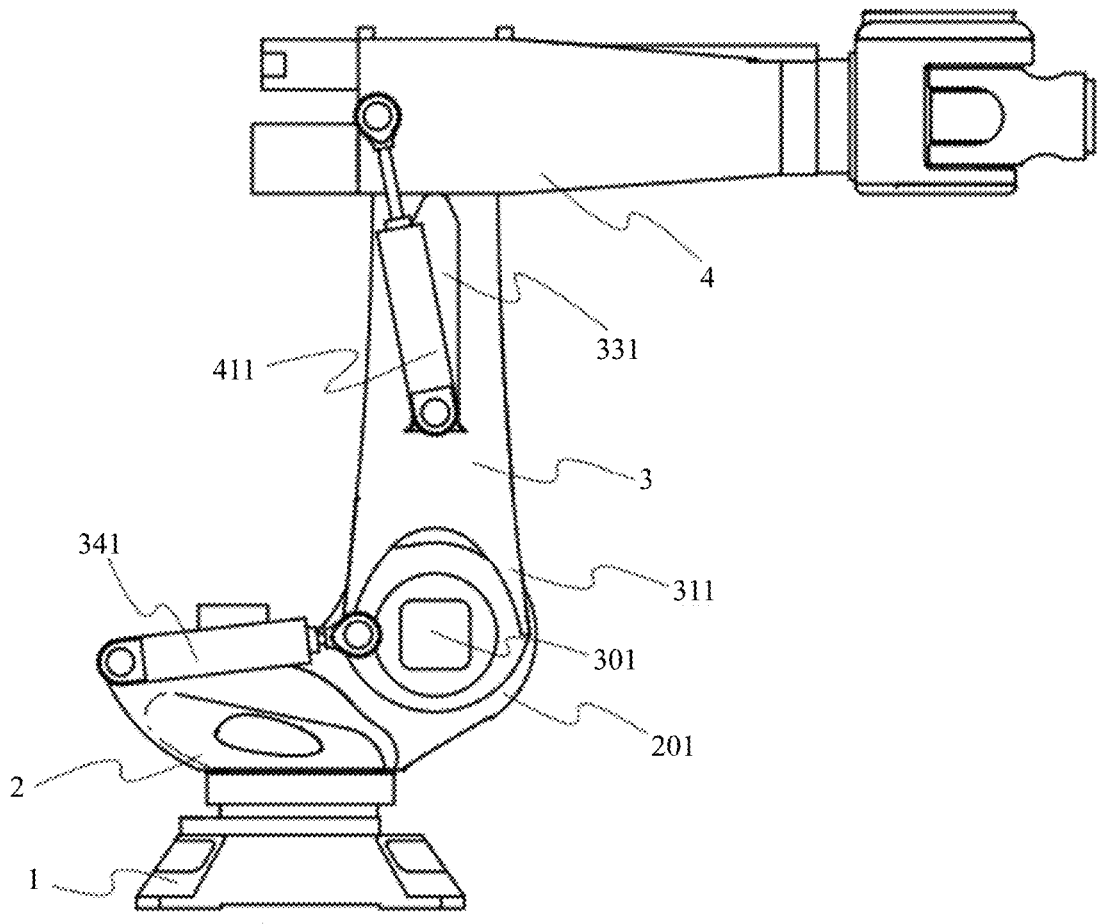
FIG. 5 is a left view of FIG. 3.

As shown in FIG. 4, the first arm 3 is located at one side of the first connecting part 311 and is provided with an inclined plane 33 extending between the first end 31 and the second end 32. The inclined plane 33 extends from the first connecting part 311 to the second connecting part 312 and from the first end 31 to the second end 32 in an inclined manner, so that the width of the first arm 3 gradually decreases from the first end 31 to the second end 32. The second end 32 is biased to one side of the second connecting part 312 in the vertical direction. The inclined plane 33 is provided with a protruded reinforcing rib 331. The reinforcing rib 331 extends from the second end 32 to the first end 31. The reinforcing rib 331 increases the overall strength of the narrower second end 32.

As shown in FIG. 4, FIG. 5, FIG. 7 and FIG. 8, the second end 32 of the first arm 3 is connected with the second arm 4. The second arm 4 is connected with the second end 32 through a second transmission 41. A second driving shaft (not shown) penetrates through the second transmission 41. One end of the second driving shaft (not shown) is connected with the motor 401 provided at one side of the second end 32.

As shown in FIG. 3, the second arm 4 is provided at one side of the first arm 3 having the inclined surface. The second arm 4 is overlapped with the transmission seat 201 in the vertical direction, so that the stress at both sides of the first transmission 303 is more uniform and the service life is longer. Because the inclined plane 33 is provided, there is larger space between the lower end of the first arm 3 and the second arm 4, which provides more rotation space for the second arm 4.

A pull rod 411 is further provided between the second arm 4 and the first arm 3. One end of the pull rod 411 is connected with one side of the second arm 4 opposite the second end 32, and the other end of the pull rod 411 is connected and fixed with the end of the reinforcing rib 331 close to the first end 31. The pull rod 411 gives a pulling force to the second arm 4. The end of the reinforcing rib 331 is provided as the connecting end of the pull rod 411, which provides a simpler installation method to the pull rod 411 of the second arm 4. Furthermore, the reinforcing rib 331 also ensures sufficient installation strength.

Figure 7:
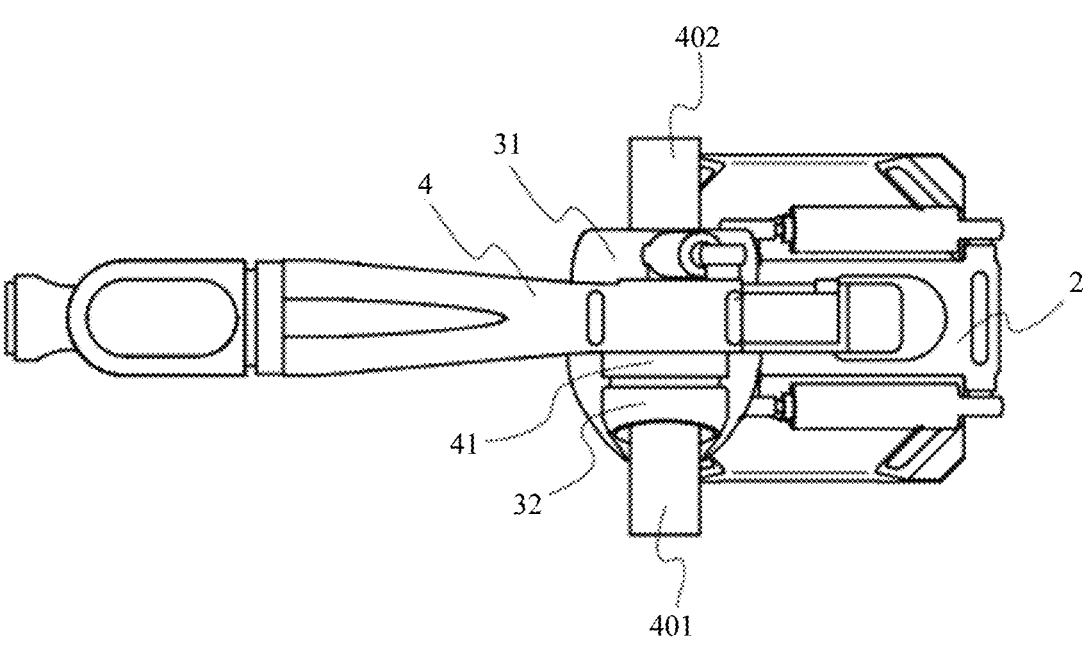
FIG. 7 is a top view of the industrial robot of the present disclosure.

As can be seen from FIG. 3, the asymmetric design of the first arm 3 allows the center of gravity of the first arm 3 to be biased to one side of the second connecting part 312 as a whole. From a top view perspective as shown in FIG. 7, the central line of the second arm 4 coincides with the top and bottom of the central line of the transmission seat 201, i.e. the central line of the second arm 4 is located directly above the central line of the transmission seat 201. This enables the weight of the second arm 4 to be transferred between the first connecting part 311 and the second connecting part 312. Because the second arm 4 and the pull rod 411 are installed on the inclined plane 33, the centers of gravity of the first arm 3 and the second arm 4 are not overly biased to one side of the transmission seat 201 as a whole, so that the stress on the transmission seat 201 is more uniform and the service life of the mechanical arm is prolonged.

Figure 6:
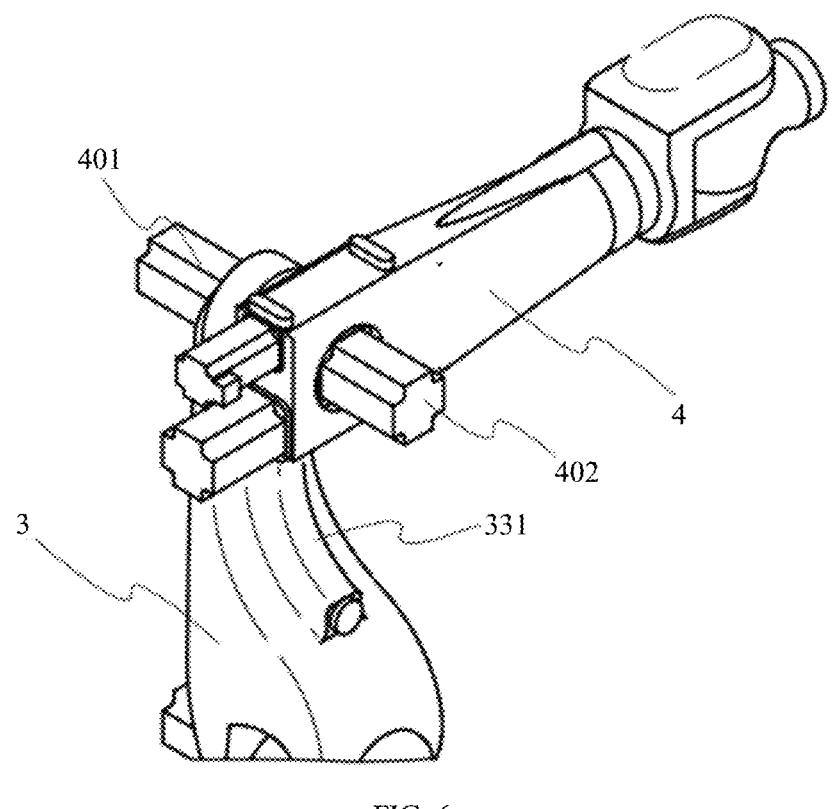
FIG. 6 is a structural schematic diagram of Embodiment 2 of the present disclosure.

As shown in FIG. 6, in Embodiment 2 of the present disclosure, the other end of the second driving shaft (not shown) is connected with the motor 402 provided at one side of the second arm 4. At this time, the second arm 4 is controlled by the motors 401 and 402, which can provide a stronger torque. At this time, the pull rod 411 may not be provided between the first arm 3 and the second arm 4.

While the present disclosure ensures the flexibility and the degree of freedom of the robot, the overall structure is more stable, the center of gravity is balanced and stable in the use process, the power is stronger, the transmission efficiency is higher, and the precision coefficient is higher, so that the robot allows more precise processing operations.

In the present disclosure, specific embodiments are applied to illustrate the principle and the implementation of the present disclosure. The description of the above embodiments is only used to help understand the method and the core idea of the present disclosure. At the same time, according to the idea of the present disclosure, there will be some changes in the specific implementation and the application scope for those skilled in the art. To sum up, the contents of this specification should not be understood as limiting the present disclosure.

What is claimed is:

1. An industrial robot, comprising:
   a rotating seat, which is rotatable and comprises a transmission seat provided thereon, and a first transmission is installed in the transmission seat;
   a first arm, connected with a second arm, wherein the first arm is rotatable and comprises a first end and a second end arranged from the bottom up, at least a part between the first end and the second end has an inclined plane which extends from the second end to the first end in an inclined way so that the second arm is substantially located directly above a central line of the transmission seat, wherein the first arm has a cross-section that gradually increases from top to bottom between the first end and the second end; and the first end of the first arm is provided with a first connecting part and a second connecting part, wherein the first connecting part and the second connecting part are provided at both sides of the transmission seat and are connected with both ends of the first transmission respectively;

the industrial robot further comprises a second transmission, the second arm is connected with the second end through the second transmission, a second driving shaft penetrates through the second transmission and has one end connected with a first motor provided at a first side of the second end, wherein the second driving shaft has another end connected with a second motor provided at a second side of the second arm.

2. The industrial robot of claim 1, wherein the inclined plane is provided with a protruding reinforcing rib extending along the inclined plane.

3. The industrial robot of claim 2, wherein the industrial robot further comprises a pull rod having one end fixed to the second arm, and the other end fixed and connected with an end of the reinforcing rib.

4. The industrial robot of claim 1, wherein the first connecting part and the second connecting part operate in response to the rotation of the first transmission.

5. The industrial robot of claim 4, wherein the industrial robot further comprises a first driving shaft, which passes through and is connected with the first transmission, at least one end of the first driving shaft is connected with a motor, and the motor is provided at one side of the first connecting part or the second connecting part opposite the first transmission.

6. The industrial robot of claim 4, wherein at least one balance lever is provided between the first arm and the rotating seat, one end of which is connected with at least one of the first connecting part and the second connecting part, and the other end of which is connected with the rotating seat.

7. The industrial robot of claim 6, wherein one side of the rotating seat opposite the transmission seat is provided with a protrusion part which is configured to connect the balance lever of the first arm.

8. The industrial robot of claim 1, wherein the second arm is arranged directly above the first end of the first arm.

9. The industrial robot of claim 1, wherein the transmission seat and the rotating seat are integrally provided on a symmetrical axis of the rotating seat at a position near the edge of the rotating seat, and the first transmission is provided in a through hole of the transmission seat.

10. The industrial robot of claim 1, wherein the industrial robot further comprises a base, a slewing bearing is provided between the base and the rotating seat, and a slewing transmission is provided on the inner side of the inner ring of the slewing bearing.

\* \* \* \* \*